United States Patent
Bowers et al.

[11] Patent Number: 5,883,582
[45] Date of Patent: Mar. 16, 1999

[54] ANTICOLLISION PROTOCOL FOR READING MULTIPLE RFID TAGS

[75] Inventors: John H. Bowers, Clarksburg, N.J.; John Nelson Daigle, University, Miss.; Rade Petrovic, Woburn, Mass.

[73] Assignee: Checkpoint Systems, Inc., Thorofare, N.J.

[21] Appl. No.: 796,645

[22] Filed: Feb. 7, 1997

[51] Int. Cl.⁶ .............................. H04Q 5/22; G08B 13/14
[52] U.S. Cl. ................................ 340/825.54; 340/572
[58] Field of Search .......................... 340/825.54, 825.5, 340/572, 505; 370/445, 447; 235/375

[56] References Cited

U.S. PATENT DOCUMENTS

| | | |
|---|---|---|
| 4,734,680 | 3/1988 | Gehman et al. . |
| 4,799,059 | 1/1989 | Grindahl et al. . |
| 4,862,160 | 8/1989 | Ekchian ............................ 340/825.54 |
| 5,103,210 | 4/1992 | Rode et al. . |
| 5,182,543 | 1/1993 | Siegel et al. . |
| 5,189,397 | 2/1993 | Watkins et al. . |
| 5,266,925 | 11/1993 | Vercellotti et al. ................. 340/825.54 |
| 5,276,431 | 1/1994 | Piccoli et al. . |
| 5,347,263 | 9/1994 | Carroll et al. . |
| 5,383,134 | 1/1995 | Wrzesinski . |
| 5,430,441 | 7/1995 | Bickley et al. . |
| 5,444,223 | 8/1995 | Blama . |
| 5,446,447 | 8/1995 | Carney et al. . |
| 5,448,230 | 9/1995 | Schanker et al. . |
| 5,530,437 | 6/1996 | Goldberg . |
| 5,530,702 | 6/1996 | Palmer et al. . |
| 5,539,394 | 7/1996 | Cato et al. . |
| 5,550,547 | 8/1996 | Chan et al. . |
| 5,591,951 | 1/1997 | Doty . |
| 5,627,544 | 5/1997 | Snodgrass et al. . |
| 5,726,630 | 3/1998 | Marsh et al. ....................... 340/825.54 |
| 5,745,036 | 4/1998 | Clare ................................. 340/825.54 |

*Primary Examiner*—Brian Zimmerman
*Assistant Examiner*—Edward Merz
*Attorney, Agent, or Firm*—Panitch Schwarze Jacobs & Nadel, P.C.

[57] ABSTRACT

A method of reading multiple RFID tags located in a field of an interrogating antenna is based on periodic transmissions from the tags with large, non-transmission intervals between transmissions. The non-transmission intervals are fixed for a given tag, but are random between tags due to manufacturing tolerances in electrical components from which the tag is constructed, such that no coordination of transmissions from the interrogating antenna is required.

31 Claims, 6 Drawing Sheets

ANTICOLLISION PROTOCOL FOR READING MULTIPLE RFID TAGS

BACKGROUND OF THE INVENTION

Tagging of articles for identification and/or theft protection is known. For instance, many articles are identified using a bar code comprising coded information which is read by passing the bar code within view of a scanner. Many articles also include a resonant tag for use in theft detection and prevention. More recently, passive resonant security tags which return unique or semi-unique identification codes have been developed. These security tags typically include an integrated circuit which stores the identification code. Such "intelligent" security tags provide information about an article to which the tag is affixed which is detected in the zone of an interrogator. The tags are desirable because they can be interrogated rapidly, and from a distance. U.S. Pat. No. 5,446,447 (Carney et al.), U.S. Pat. No. 5,430,441 (Bickley et al.), and U.S. Pat. No. 5,347,263 (Carroll et al.) disclose three examples of intelligent tags.

Intelligent tagging of articles provides substantial benefits at the point of manufacture, at the point of distribution, and at the point of sale. That is, any place where articles are stored, shelved, displayed or inventoried, intelligent tags can result in substantial cost savings. For example, one function of a distribution center is to take merchandise that has been packed and shipped in bulk, and repack the merchandise into smaller "tote" boxes. Often the tote box is packed with single units of a variety of products. Mistakes in inventory during this repacking process can be very costly and there is a possibility of shipping products to the wrong retailer. An intelligent tagging system can check the contents of tote boxes with an interrogator or point reader at high speeds and confirm exactly what is being shipped to individual retailers.

Employees today spend many hours hand counting articles for inventory control and manually checking product expiration dates. Intelligent tags obviate the need for such hand counting and manual data checking. Rather than hand counting a plurality of items, an employee can point an intelligent tag reader at individual product clusters on shelves and scan entire product groups in minutes. Intelligent tags also allow employees to scan a product group to learn critical expiration dates to avoid spoilage, reduce stock and maintain continuous inventory counts.

Another example of an environment in which the use of intelligent tags is desirable is a library. Manual taking of inventory of a library collection is an expensive and time consuming task. Currently inventory taking is such an expensive and time consuming task that most libraries do not conduct a full inventory check as frequently as they should, if at all. Accordingly, there is a need for systems which allow library employees to efficiently check their inventory. Intelligent tags fulfill such a need.

One problem with attempting to read multiple RFID tags within an interrogation zone of a reader is that more than one tag could be activated by the reader or interrogator at about the same time, such that two or more tags may transmit their identification information to the reader at about the same time, thus causing the information to collide, which corrupts the information and prevents the reader from obtaining the desired information. In order to overcome such data collisions, some interrogators include a means for controlling the transmission of data from individual tags, for example, by shutting individual tags off for predetermined time periods after a response signal is transmitted. However, the transmission of a signal by the interrogator to an individual tag to shut the tag off may require the generation of signals in excess of the levels allowed by regulatory authorities, such as the Federal Communications Commission (FCC). Other systems include tags which include circuitry to detect the simultaneous transmission of data by multiple tags. Upon detection of such simultaneous transmissions, the tags abort their transmissions and wait for a prescribed time prior to retransmission, usually for a period of time that is set by a random number. However, this method requires the tags include detection circuitry and a battery, both of which excessively increase the cost of the tag. Accordingly, there is a need for a method of detecting substantially simultaneous transmission of data by multiple tags at the same frequency located within an interrogation zone and compensating for such multiple transmissions in order to accurately read the data transmitted by each tag.

The present invention provides a method of simultaneously reading multiple RFID tags located in a field of an interrogating antenna based on periodic transmissions from the tags with long non-transmission intervals between transmissions. The non-transmission intervals are fixed for a given tag, but are random between tags, preferably due to manufacturing tolerances, such that no co-ordination of transmissions from the interrogating antenna is required.

BRIEF SUMMARY OF THE INVENTION

Briefly stated, the present invention comprises a method of reading data from a plurality of radio frequency intelligent devices located within an interrogation zone using a one sided protocol, with the devices never being turned off. In a first step, an interrogation device transmits a continuous interrogation signal. The interrogation signal comprises an electromagnetic field at a first predetermined radio frequency, wherein a strength of the electromagnetic field defines the interrogation zone. In a second step, a plurality of radio frequency intelligent devices located within the interrogation zone are acted upon by the electromagnetic field. The electromagnetic field induces a voltage in each intelligent device which provides power to the intelligent devices.

In response to being powered by the induced voltage, each of the plurality of intelligent devices within the interrogation zone reads a respective prestored data field and repeatedly transmits a message stored therein at a second predetermined radio frequency at predetermined periodic intervals with a fixed length nontransmission interval between each transmission interval. A length of the non-transmission interval is much greater than a length of the message transmission interval. The interrogation device reads the message transmissions of each of the plurality of intelligent devices. A probability of two or more of the plurality of intelligent devices transmitting their respective messages simultaneously (i.e. having overlapping transmission intervals) is reduced due to variations among the intelligent devices in the fixed non-transmission time and by making the length of the non-transmission interval much greater than the length of the message transmission interval.

The present invention also provides a radio frequency intelligent device comprising:

an integrated circuit for storing data;

an antenna connected to the integrated circuit, wherein exposure of the antenna to an electromagnetic field at a first predetermined radio frequency induces a voltage therein which provides power to the integrated circuit such that the data stored therein is read from the integrated circuit and repeatedly transmitted at a second predetermined radio frequency;

a predetermined transmission period for repeatedly transmitting the integrated circuit data at the second predetermined resonant frequency; and a fixed wait period between each predetermined transmission period, wherein the wait period is much greater than the transmission period.

The present invention is also a radio frequency identification device comprising:

an integrated circuit for storing data;

an antenna connected to the integrated circuit, the antenna comprising an inductor and a capacitor, wherein exposure of the antenna to an electromagnetic field at a first predetermined radio frequency induces a voltage in the inductor which provides power to the integrated circuit such that the data stored therein is read and provides a continuous data output signal;

a transmitter for repeatedly transmitting the data output signal at a second predetermined radio frequency; and a timer for establishing a fixed non-transmission period between each data transmission period, wherein a length of the non-transmission period is much greater than a length of the transmission period.

BRIEF DESCRIPTION OF THE SEVERAL VIEWS OF THE DRAWINGS

The foregoing summary, as well as the following detailed description of a preferred embodiment of the invention, will be better understood when read in conjunction with the appended drawings. For the purpose of illustrating the invention, there is shown in the drawings an embodiment which is presently preferred, it being understood, however, that the invention is not limited to the precise arrangement and instrumentalities disclosed. In the drawings:

FIG. 4b is a continuation of the timing diagram of FIG. 4a;

DETAILED DESCRIPTION OF THE INVENTION

Figure 1:
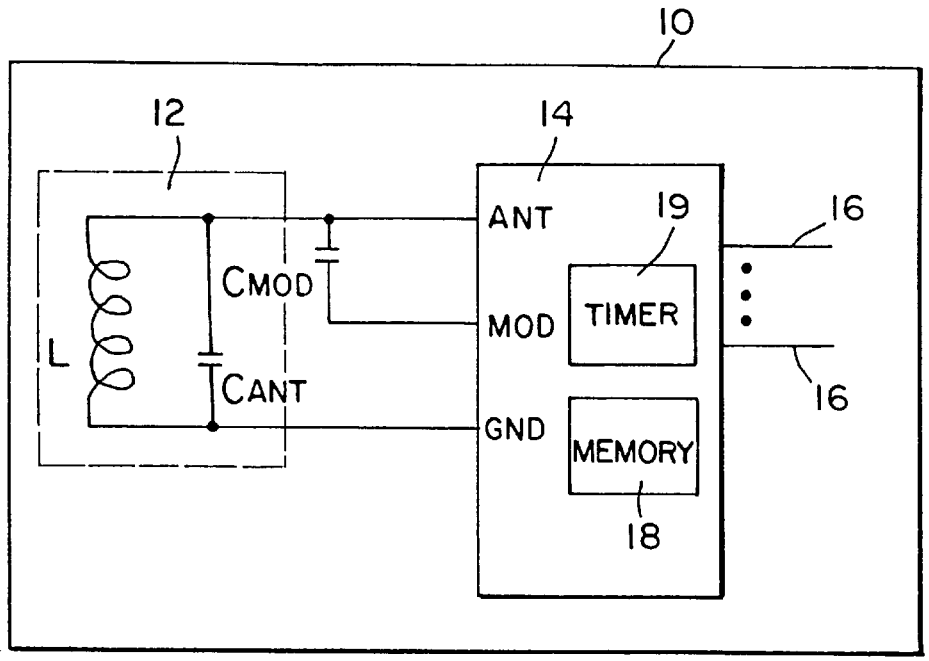
FIG. 1 is a schematic diagram of an equivalent electrical circuit of a resonant frequency identification (RFID) device in accordance with a preferred embodiment of the present invention.

Certain terminology is used in the following description for convenience only and is not limiting. The words "top", "bottom", "lower" and "upper" designate directions in the drawings to which reference is made. The terminology includes the words above specifically mentioned, derivatives thereof and words of similar import.

The present invention is directed to a method of reading multiple RFID tags or intelligent devices simultaneously. The method is achieved by providing tags which continuously transmit their respective identification information for as long as the tag is within an interrogation zone. Each data transmission is followed by a fixed wait period or non-transmission interval. The non-transmission interval is preferably more than ten times greater than the data transmission period. Each tag is constructed such that electrical components within each tag include predetermined manufacturing tolerances, such that although the length of the non-transmission interval is fixed for each tag, the non-transmission interval varies between tags at least within the prescribed tolerances. The variation in the length of non-transmission intervals among tags causes the transmission intervals among the tags to be skewed, or not to overlap when the tag is within the interrogation zone. That is, there is a high probability that no two tags will simultaneously begin and thereafter continue data transmission at the same instant in time (and thus cause a data collision). Further, over a period of time, such as a period of time including four transmission intervals of a tag, the probability increases that the interrogator will successfully receive each tag's identification information. That is, over a period of time including several transmission intervals for each tag, an interrogation device is able to successfully read each tag's identification information.

Referring now to the drawings, wherein the same reference numeral designations are applied to corresponding elements throughout the several figures, there is shown in FIG. 1 a schematic diagram of an equivalent electrical circuit of a resonant frequency identification tag or device 10 in accordance with a preferred embodiment of the present invention. RFID tags are generally known and applicable to a wide variety of uses. U.S. Pat. No. 5,430,441 discloses a transponding tag which transmits a digitally encoded signal in response to an interrogation signal. The above disclosed tag comprises a rigid substrate constructed from a plurality of dielectric layers and conductive layers and includes an integrated circuit embedded entirely within a hole in the substrate and tab bonded to conductive foil traces. The device 10 comprises an antenna 12 electrically connected to an integrated circuit (IC) 14. Preferably, the antenna 12 comprises a resonant circuit which resonants at a predetermined radio frequency (RF) corresponding to a radio frequency of an associated interrogation device, as discussed in more detail hereinafter.

The antenna 12 may comprise one or more inductive elements electrically connected to one or more capacitive elements. In a preferred embodiment, the antenna 12 is formed by the combination of a single inductive element, inductor, or coil L electrically connected with a capacitive element or capacitance $C_{ANT}$ in a series loop. As is well known to those of ordinary skill in the art, the operational frequency of the antenna 12 depends upon the values of the inductor coil L and the capacitor CANT. The size of the inductor L and the value of the capacitor $C_{ANT}$ are determined based upon the desired resonant frequency of the antenna 12. In one embodiment of the invention, the device 10 is constructed to operate at 13.56 MHZ. Although it is preferred that the device 10 resonates at about 13.56 MHZ, the device 10 could be constructed to resonate at other frequencies and the precise resonant frequency of the device 10 is not meant to be a limitation of the present invention. Thus, it will be apparent to those of ordinary skill in the art that the antenna 12 may operate at radio frequencies other than 13.56 MHZ, and indeed at other frequencies, such as microwave frequencies. In addition, although the device 10 includes a single inductive element L and a single capacitor element $C_{ANT}$, multiple inductor and capacitor elements could alteratively be employed. For instance, multiple element resonant circuits are well known in the electronic security and surveillance art, such as described in U.S. Pat. No. 5,103,210 entitled "Activatable/Deactivatable Security Tag for Use with an Electronic Security System", which is incorporated herein by reference. Although a preferred antenna is described, it will be apparent to those of ordinary skill in the art from this disclosure that any means for coupling energy to/from the IC 14 may be used.

Figure 2:
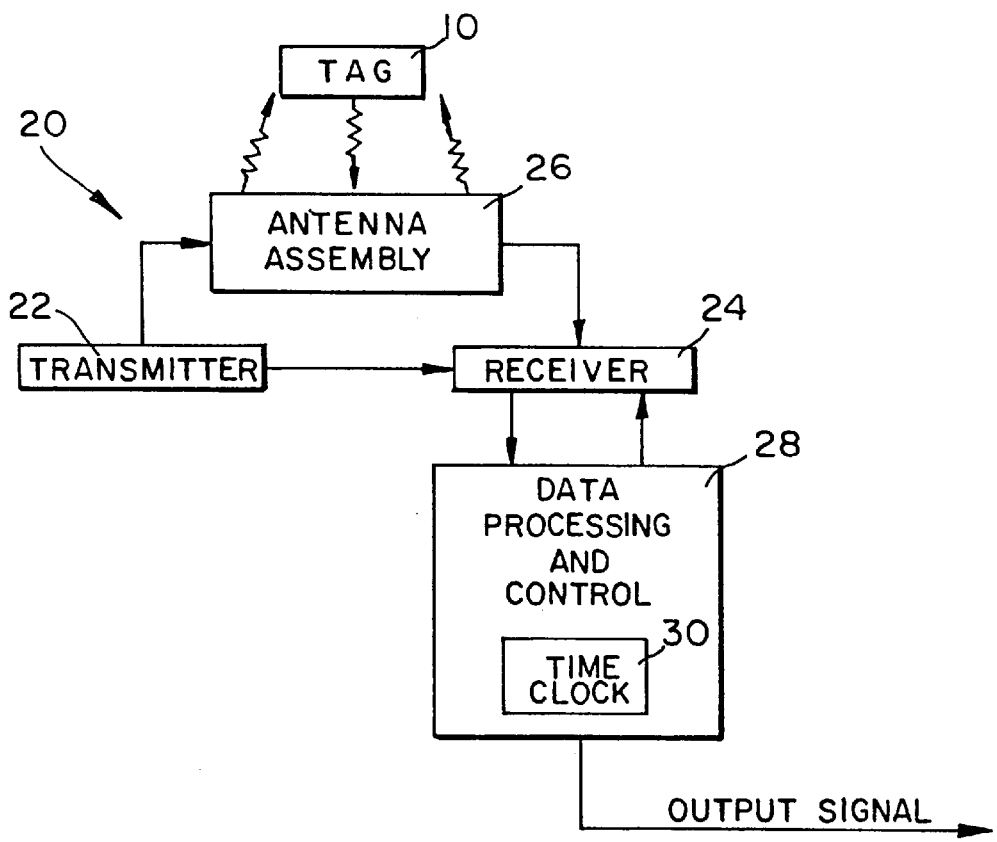
FIG. 2 is a schematic block diagram of an interrogator and an RFID tag in accordance with the present invention.

The IC 14 preferably includes a programmable memory 18, such as a 64 or 128 bit memory, for storing bits of identification data, although larger or smaller programmable memories could also be used. The IC 14 outputs a data stream comprised of the 64 (or 128) bits of data when sufficient power is applied thereto. The data bits or digital value stored in the programmable memory 18 can be used for a variety of purposes, such as to identify a particular object or person associated with the device 10. The memory 18 may comprise one or more data fields for storing one or more digitally encoded messages. The stored digital value may be unique to each device 10, or in some instances, it may be desirable for two or more devices to have the same stored digital value. In addition to identifying an object, the data stored in the memory 18 could be used to store product identity information, product warranty information, as well as other information, such as when and where the product was manufactured, etc. Thus, when the device 10 is powered by an induced voltage, the IC 14 outputs the data stored in the programmable memory 18. The data is then transmitted at a predetermined radio frequency which is detectable by an interrogation device 20 (FIG. 2). The transmission of the data by the device 10 is termed herein a transmission period or interval.

The IC 14 also preferably includes a timer circuit 19 which establishes or defines a non-transmission period or interval, such that each data transmission interval is followed by a non-transmission interval. During a non-transmission interval, the device 10 does not transmit or radiate a signal. According to the present invention, a time length of the non-transmission interval is generally fixed. That is, the timer circuit 19 establishes a single, fixed, non-transmission interval. The timer circuit 19 requires the device 10 to wait for a fixed length or period of time after data is transmitted therefrom until data is again transmitted therefrom. Consequently, each data transmission interval is followed by a fixed length non-transmission interval. The non-transmission interval may be established by having the timer circuit 19 generate an enable signal which enables the device 10 to transmit data. Alternatively, the timer circuit 19 could interact with the memory 18 such that the memory 18 is only strobed or read at fixed intervals.

The timer circuit 19 is constructed to time or count for a predetermined, fixed length of time, after each transmission interval or memory 18 access. The timer circuit 19 may be constructed using a variety of electrical components or devices, as is known by those of ordinary skill in the art. The specific manner in which the timer 19 is designed and the electrical components from which the timer 19 is constructed is not important. That is, the timer circuit 19 could count up, count down, or be a simple delay circuit. Although it is preferred that the timer 19 be constructed as an integral part of the IC 14 and that the timer 19 interacts with the memory 18, the timer 19 could interact with an output of the IC 14, rather than the memory 18. Also, the timer 19 could be constructed external to the IC 14. It is to be understood that the importance of the timer 19 is that it functions to assure that a data transmission interval is followed by a fixed length non-transmission interval.

A proximity reader or interrogator device 20 (FIG. 2) is used to detect and read the information transmitted by the device 10. In operation, the reader/interrogator 20 establishes an electromagnetic field at or near the resonant frequency of the antenna 12. When the device 10 is close enough to the reader/interrogator 20 so as to be within the electromagnetic field, a voltage is induced on the inductive coil L, which provides power to the IC 14 at the ANT input of the IC 14. Preferably, the IC 14 internally rectifies the induced AC voltage at the ANT input to provide an internal DC voltage source. When the internal DC voltage reaches a level that assures proper operation of the IC 14, the IC 14 functions to output the digital value stored in the programmable memory at the MOD output of the IC 14.

In the presently preferred embodiment, the antenna 12 comprises a resonant circuit. A modulation capacitor $C_{MOD}$ is connected to the MOD output of the IC 14 and to the resonant circuit (antenna) 12. The data output pulses at the MOD output switch the capacitor $C_{MOD}$ into and out of the resonant circuit 12 by making and breaking ground connections to change the overall capacitance of the resonant circuit 12 in accordance with the stored data, which in turn changes the resonant frequency of the resonant circuit 12, detuning it from a principal operational frequency to a predetermined higher frequency. Thus, data pulses of the device 10 are created by the tuning and detuning of the resonant circuit 12. The reader/interrogator 20 senses the changes in the consumption of energy within its electromagnetic field to determine the digital data value output from the IC 14. Although a particular method and circuit for outputting or transmitting data to the interrogator 20 is disclosed, other means of transmitting stored data to the interrogator 20, such as other modulation techniques, are within the scope of the present invention.

The IC 14 may also include a power return or GND output and one or more additional inputs 16 which are used for programming the IC 14 (i.e. storing or altering the digital value therein) in a conventional manner. In the presently preferred embodiment, the IC 14 comprises 128 bits of nonvolatile memory. Of course, it will be apparent to those of ordinary skill in the art that the programmable memory 18 could have either a greater or smaller storage capacity.

Referring now to FIG. 2, a schematic block diagram of the interrogator 20 suitable for use with the RFID tag or device 10 described in FIG. 1 is shown. The interrogator 20 and the RFID device 10 communicate by inductive coupling, as is well known in the art. The interrogator 20 includes a transmitter 22, receiver 24, antenna assembly 26, and data processing and control circuitry 28, each having inputs and outputs. The transmitter 22 generates an interrogation signal which is provided to the antenna assembly 26 for generating an electromagnetic field at a first predetermined radio frequency. The strength of the electromagnetic field determines the size of the zone in which the RFID devices 10 will be powered and detected (i.e. the interrogation zone). The receiver 24 detects changes in the electromagnetic field caused by the transmission of a data output signal by an RFID device 10. The output of the transmitter 22 is connected to a first input of the receiver 24, and to the input of the antenna assembly 26. The output of the antenna assembly 26 is connected to a second input of the receiver 24. A first and a second output of the data processing and control circuitry 28 are connected to the input of the transmitter 22 and to a third input of the receiver 24, respectively Furthermore, the output of the receiver 24 is connected to the input of the data processing and control circuitry 28. Interrogators having this general configuration may be built using circuitry described in U.S. Pat. Nos. 3,726,960, 3,816,708, 4,103,830 and 4,580,041, all of which are incorporated by reference in their entirety herein. Preferably however, the data processing and control circuitry of the interrogator described in these patents are modified to append date and time data thereto (e.g. a time-stamp). A time clock 30 is provided in the data processing and control circuitry 28 for appending the date and time data. The interrogator 20 is preferably a hand-held device. However, other physical manifestations of the interrogator 20 are within the scope of the invention, such as a pedestal structure. Moreover, the interrogator 20 may comprise a separate structure from the transmitter 22 and an associated antenna, and from the receiver 24 and an associated antenna, as is known in the art.

The interrogator 20 can detect transmissions from a plurality of devices 10 (and thus their associated articles) located within the interrogation zone. In most instances, each of the devices 10 receive and respond to the interrogation signal at a different instant in time, even when the devices 10 are physically close together. The string of returned signals is processed to sort out the individual signals from each of the devices 10. However, if two devices 10 transmit a data signal at exactly the same time or at partially overlapping times, the interrogator 20 can detect this event and discard the data signals. Such detection circuitry is conventional and known by those of ordinary skill in the art. According to the present invention, the interrogation signal generated by the interrogator 20 is a generally continuous signal, as opposed to a periodic or pulsed signal. As previously discussed, the interrogation signal is internal to the interrogator 20 and is provided to the antenna assembly 26 to generate an electromagnetic field. The interrogation zone is the area within the electromagnetic field in which a voltage is induced in the intelligent device 10 sufficient to power the IC 14. Thus, the size of the interrogation zone is defined by the strength of the electromagnetic field.

As long as a device is within the interrogation zone, the device 10 continually transmits or outputs its data. In order to allow the interrogator 20 to detect and receive data from a plurality of devices 10 located within the interrogation zone, after transmission of data by a particular device 10, as previously discussed, the device 10 waits for a fixed length of time before again transmitting its data.

Figure 3A:
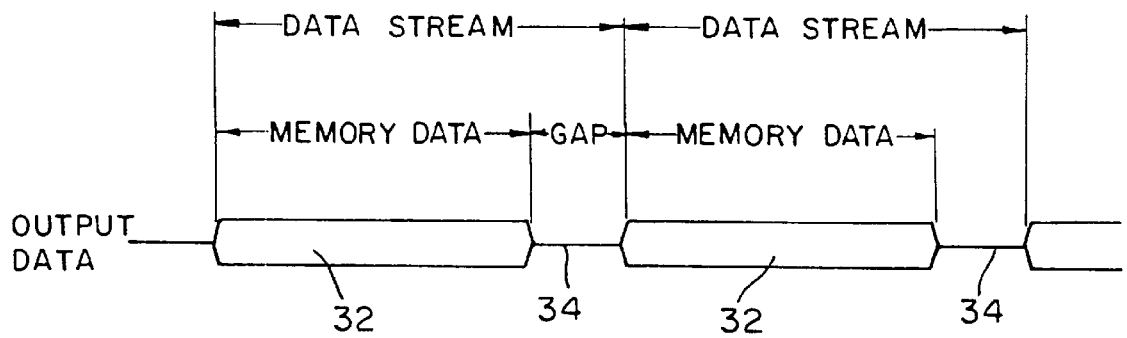
FIG. 3a is a timing diagram of a protocol for transmitting data from the RFID device.

Referring now to FIG. 3a, a timing diagram of a protocol for transmitting data from the RFID device 10 is shown. The RFID device 10 output data stream comprises memory data 32 followed by a fixed length gap or period where no data is transmitted 34. The memory data portion 32 comprises the message being transmitted from the device 10. The message may comprise all of the bits of information stored in the programmable memory 18 or a selected number of the data bits stored in the memory 18. Note that the RFID device 10 continues to transmit its output data stream as long as the RFID device 10 is within the interrogation zone and the induced voltage from the electromagnetic field is high enough. The message may further comprise additional bits of information not stored in the data memory 18, such as for error detection and correction, or other control purposes, as will be apparent to those of skill in the art.

Figure 3B:
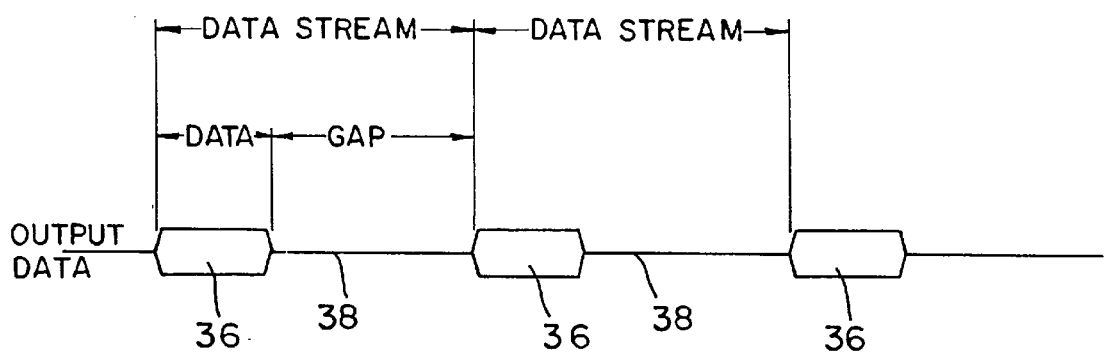
FIG. 3b is a timing diagram of a preferred protocol for transmitting data from the RFID device.

As illustrated in FIG. 3a, the memory data portion 32 of the output data stream is longer than the gap or non-transmission interval 34. FIG. 3b is a timing diagram of a preferred protocol for transmitting data stored in the RFID device 10. Similar to the protocol shown in FIG. 3a, the output data stream comprises a memory data portion 36 followed by a fixed length gap or non-transmission interval 38, and the RFID device 10 continuously outputs the data stream as long as the device 10 is within the interrogation zone and the induced voltage from the electromagnetic field is high enough. The difference between the protocol of FIG. 3a and the protocol of FIG. 3b is that the length of the non-transmission interval 38 is greater than the length of the memory data portion 36 in FIG. 3b. Preferably, the length of the non-transmission interval 38 is much greater than the length of the memory data portion 36, such as about 100 times longer. The timing circuit 19 establishes the length of the non-transmission interval. For instance, the data transmission interval 38 could comprise about 1 millisecond and the non-transmission interval could comprise about 100 milliseconds.

As previously discussed, the timing circuit 19 establishes the length of the non-transmission interval 38, which is preferably of generally fixed length. However, it has been determined that by constructing the timing circuit 19 using electrical components of a predetermined tolerance level, such as a +/−20% tolerance, that although the non-transmission interval 38 is a fixed length for a particular device, the length of the non-transmission interval varies among a plurality devices due solely to the manufacturing tolerance, which decreases the probability that two or more devices will transmit their memory data 36 at the same instant in time. That is, varying the length of the non-transmission interval 38 among various devices 10 desynchronizes transmissions between devices 10. In contrast, if the timing circuit 19 is constructed using electrical components with a tighter tolerance level, such as +/−5%, then the timing circuits in different devices are more likely to have the same length non-transmission interval and consequently, it is more likely that two or more devices within an interrogation zone will simultaneously transmit their memory data 36, thus causing a data collision. Thus, in operation, each device 10 within the interrogation zone theoretically transmits its memory data 36 at the same time, in reality, variations in the electrical components comprising the timing circuit 19 cause the devices to transmit their memory data 36 at least slightly different times. In addition, even should two or more devices 10 initially transmit their memory data 36 at the same time or at overlapping times, because the length of the non-transmission interval 38 is much greater than the length of the transmission interval 36, the non-transmission interval 38 among the devices should vary enough such that the next or a subsequent transmission interval 36 for each device 10 will likely occur at a different instant in time. Making the non-transmission interval 38 much greater than the transmission interval 36 and varying the tolerance of the fixed non-transmission interval 38 among the devices 10 has been found sufficient to ensure that when the number of devices 10 within the interrogation zone of the interrogator 20 is smaller than a predetermined interrogation duration divided by the duration of a single message transmission, all or a very high proportion of all of the devices 10 within the interrogation zone will be detected and the data transmitted therefrom read.

Figure 4A:
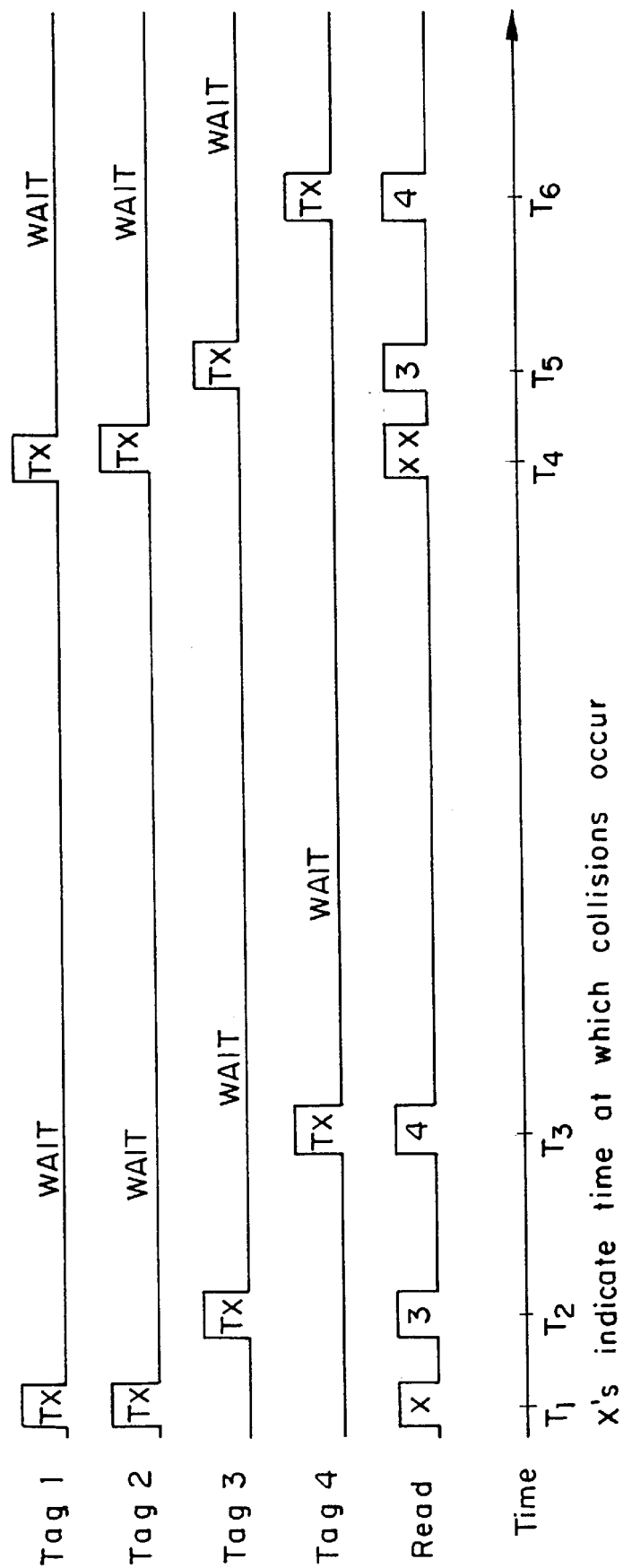
FIG. 4a is a timing diagram of a plurality of tags each outputting a data signal in response to an interrogation signal according to a preferred embodiment of the present invention.

Referring now to FIG. 4a, a timing diagram of a plurality of devices or tags 10 outputting a data signal in response to an interrogation signal according to a preferred embodiment of the present invention is shown. FIG. 4a shows the output data transmissions of four tags (tag1, tag2, tag3, tag4). "TX" represents a data transmission interval, which is followed by "WAIT", a relatively long non-transmission interval, before the next transmission interval (TX). The "Read" line illustrates the transmission of data from a particular tag to the interrogator 20.

At time $T_1$, tag1 and tag2 each transmit their respective data messages (indicated by TX). Also at time $T_1$, the interrogator 20 attempts to read the data messages, but a collision occurs (indicated by X) so no tag data is read. At time $T_2$, tag3 transmits its data message. Since no other tags are transmitting during time $T_2$, the interrogator 20 reads the tag3 data message. Similarly at time $T_3$, tag4 transmits its data message and the interrogator 20 reads the tag4 data message The reasons tag3 and tag4 may begin their respective data message transmissions later in time than tag1 and tag2 may be attributed to a number of reasons, such as tag3 and tag4 may be physically located further from the interrogator 20, such that it takes longer for an adequate voltage to be induced in tag3 and tag4, or with the electrical components specified to have a manufacturing tolerance level of about +/−20%, the programmable memory 18 access time could be slightly longer.

At time $T_4$, after waiting for a predetermined fixed length of time, tag1 and tag2 once again each transmit their respective data messages (indicated by TX). Note that at $T_4$, tag2's data transmission begins later in time than tag1's data transmission. This delay is attributable to variations in the timing circuits 18 of the respective tags due to the range in manufacturing tolerances of the components comprising the tags, as previously discussed. Also at time $T_4$, the interrogator 20 attempts to read the data messages, but again a collision occurs (indicated by XX) so no tag data is read. At time $T_5$, tag3 transmits its data message. Since no other tags are transmitting at time $T_5$, the interrogator 20 reads the tag3 data message. Similarly at time $T_6$, tag4 transmits its data message and the interrogator 20 reads the tag4 data message. In the presently preferred embodiment, redundant readings from the same tag are discarded as duplicative. However, it is understood that such redundant readings could be used for other purposes, such as error checking.

Figure 4B:
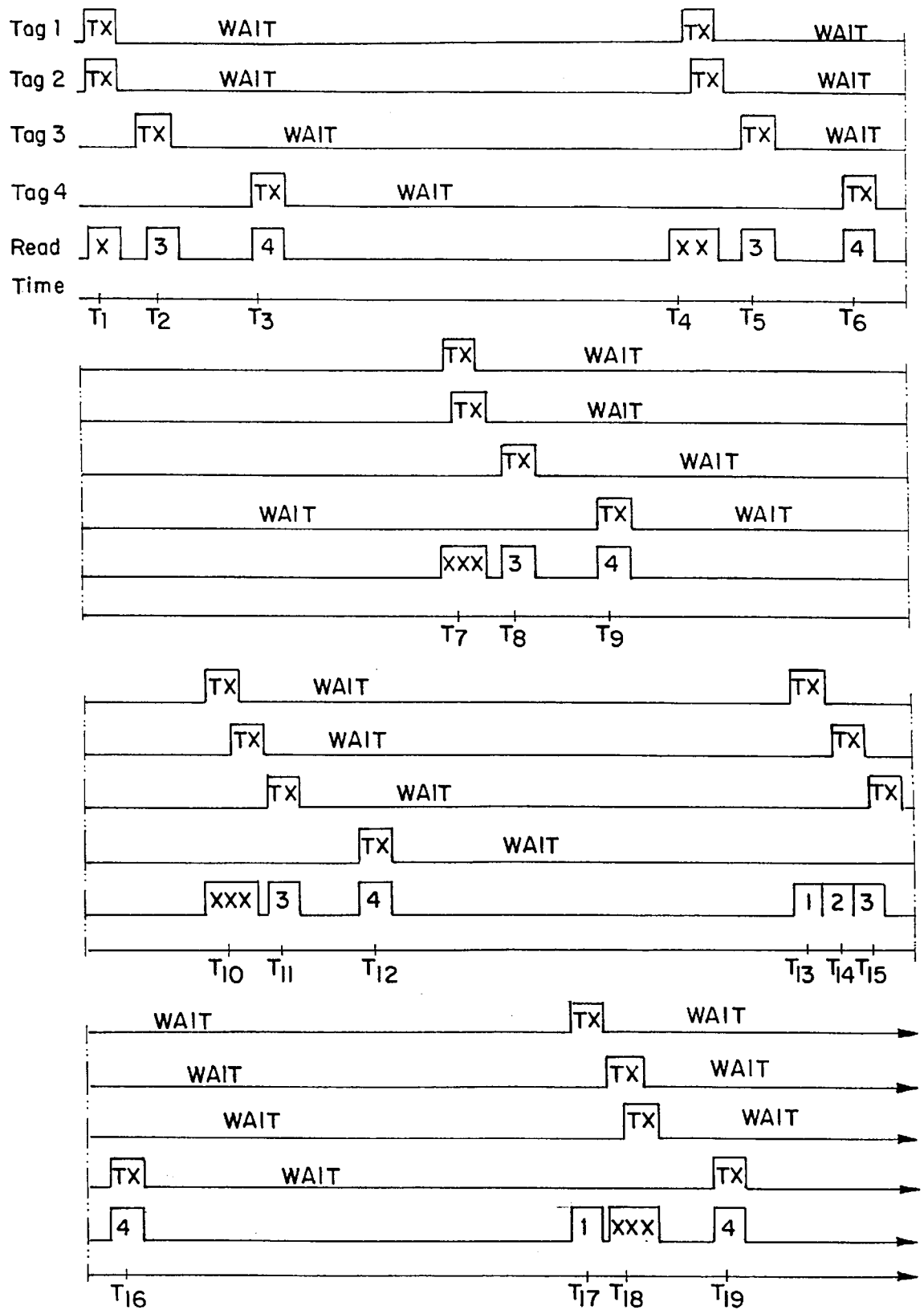

FIG. 4b is a continuation of the timing diagram of FIG. 4a but with a larger scale. In FIG. 4b, six transmission periods are shown for each of tag1, tag2, tag3 and tag4. As can be seen from the timing diagram, with each new data transmission period, the difference in the starting time of a data transmission between tag1 and tag2 increases, until at times $T_{13}$ and $T_{14}$, the interrogator 20 is able to successfully separately read the data transmissions of tag1 and tag2, respectively. Thus, over a relatively short period of time, the interrogator 20 is able to successfully separately read the data message transmitted from each tag or device 10 The timing diagrams of FIGS. 4a and 4b illustrate how relatively minor differences in the timer circuit 19, preferably caused by slight variations in the electrical components thereof, skew the data transmission periods of a plurality of tags or devices. For example, if in FIG. 4b each data transmission period is abut 1.3 milliseconds (142 bits at 80 kb/s) and each wait period is about 100 milliseconds, the interrogator 20 is able to successfully read the data message transmitted by each of the tags (tag1–tag4) in about 410 milliseconds. Thus, in less than one-half of one second, the interrogator 20 is able to read all four tags.

Figure 5A:
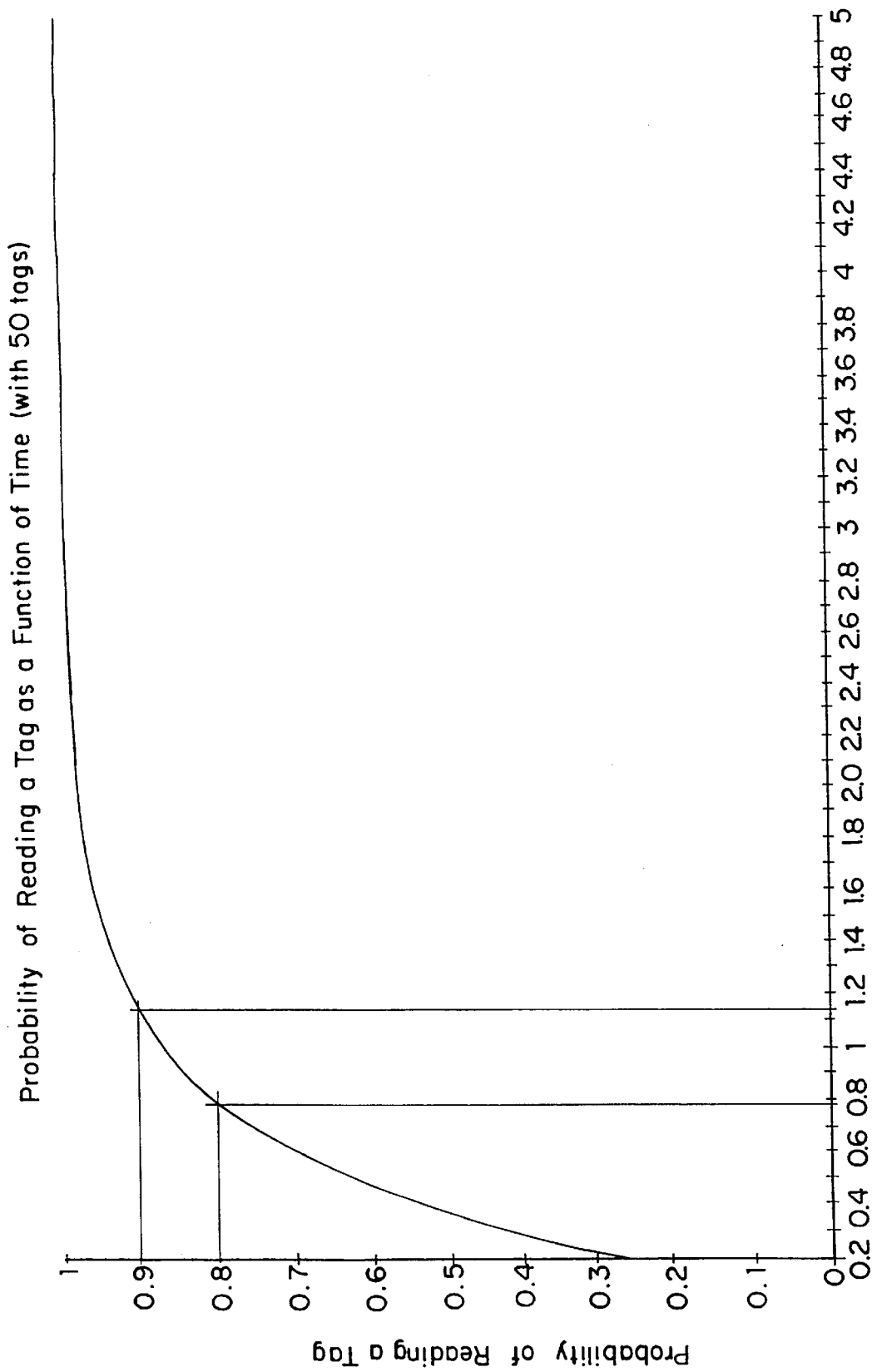
FIG. 5a is a graph of the probability of reading a plurality of RFID devices as a function of time.

Referring now to FIG. 5a, a graph of the probability of reading a device 10 from among a plurality of RFID devices 10, fifty devices in particular, as a function of time is shown for devices using the protocol of the present invention and according to this example (142 bits at 80 kbps and about 100 milliseconds between transmissions). At about 0.8 seconds, the probability of reading a device 10 is about 80%. At about 1.1 seconds, the probability of reading a device 10 is about 90%, and after about three seconds, the probability approaches unity (100%).

Figure 5B:
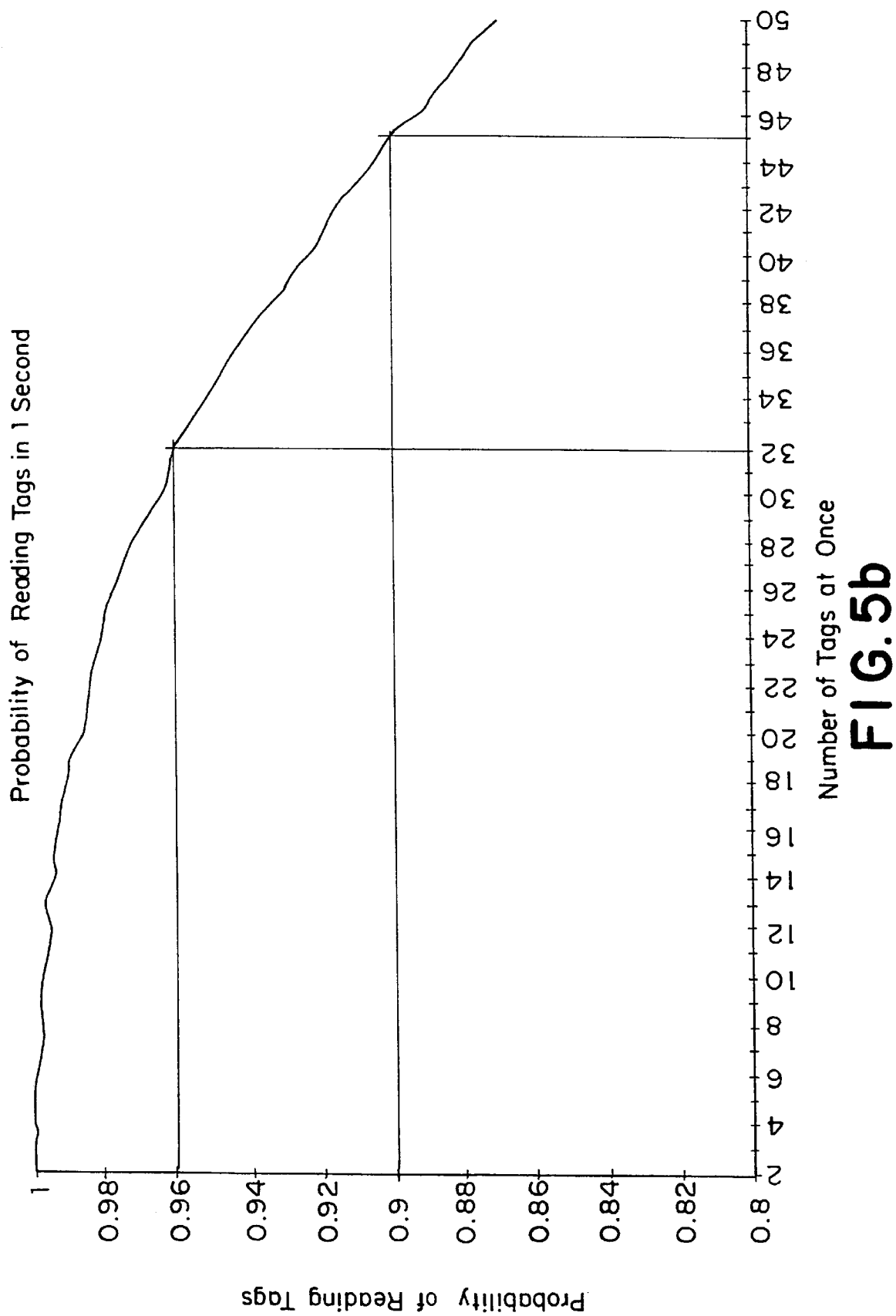
FIG. 5b is a graph of the probability of reading a plurality of RFID devices within a predetermined time limit.

FIG. 5b is a graph illustrating the probability of reading a plurality of RFID devices within one second under the same conditions as FIG. 5a. According to the graph, the probability of reading 50 tags or devices 10 in one second is about 0.87. The probability of reading 45 tags in one second is about 0.9. The probability of reading 32 tags in one second is about 0.96 and the probability of reading 25 tags in one second is about 0.98. Thus, FIG. 5b illustrates that in a relatively short period of time, a plurality of tags or devices 10 may be read by the interrogator 20.

The RFID device 10 has many applications, including inventory control of tagged items, such as for books in a library, raw materials in a manufacturing environment, or merchandise in a retail environment. It will also be apparent to those of skill in the art that the device 10 can be used in many other commercial applications. Although the invention is described with reference to resonant circuit tags, and in particular, radio frequency identification (RFID) tags which are powered by a radio frequency interrogation signal, it will be recognized by those of ordinary skill in the art that the inventive concepts disclosed are applicable to other devices which would benefit from the output protocol disclosed herein. Accordingly, the present invention is not meant to be limited to RFID tags.

The present invention, in addition to an RFID device 10, further comprises a method of simultaneously reading a plurality of RFID devices 10 based on inherent differences in the devices 10 and the ability of the devices 10 to respond to an interrogation signal. It will be recognized by those skilled in the art that changes may be made to the above-described embodiment of the invention without departing from the inventive concepts thereof. It is understood, therefore, that this invention is not limited to the particular embodiment disclosed, but is intended to cover any modifications which are within the scope and spirit of the invention as defined by the appended claims.

We claim:

1. A method of reading data from a plurality of radio frequency intelligent devices located within an interrogation zone comprising the steps of:

an interrogation device transmitting a generally continuous interrogation signal, the interrogation signal comprising an electromagnetic field at a first predetermined radio frequency, wherein a strength of the electromagnetic field defines the interrogation zone;

a plurality of radio frequency intelligent devices located within the interrogation zone being acted upon by the electromagnetic field, the electromagnetic field inducing a voltage in each intelligent device which provides power to the intelligent devices;

each of the plurality of intelligent devices within the interrogation zone reading a respective prestored data field and repeatedly transmitting a message stored therein at a second predetermined radio frequency at predetermined periodic intervals with a fixed length non-transmission interval between each transmission interval, wherein a length of the non-transmission interval is much greater than a length of the message transmission interval, the length of the non-transmission interval for each intelligent device being different due solely to manufacturing tolerances in electrical components of the intelligent devices; and the interrogation device reading the message transmissions of each of the plurality of intelligent devices, wherein a probability of two or more of the plurality of intelligent devices transmitting their respective messages simultaneously is significantly reduced due to variations among the intelligent devices in the fixed non-transmission time and by making the length of the non-transmission interval much greater than the length of the message transmission interval, and wherein the manufacturing tolerances are sufficiently large so as to significantly vary the fixed non-transmission time among the plurality of intelligent devices and thereby significantly reduce the probability that two or more of a plurality of intelligent devices will transmit their respective messages simultaneously.

2. The method of claim 1 wherein each device transmits a unique message.

3. The method of claim 1 wherein the message is directly related to the prestored data.

4. The method of claim 1 wherein the manufacturing tolerance for the electrical components is about +/−20%.

5. The method of claim 1 wherein the manufacturing tolerance for the electrical components is about +/−5%.

6. The method of claim 1 wherein the length of the non-transmission interval is at least one hundred times greater than the length of the message transmission interval.

7. The method of claim 1 wherein the length of the non-transmission interval is at least ten times greater than the length of the message transmission interval.

8. The method of claim 1 wherein the plurality of intelligent devices located within the interrogation zone is less than a predetermined duration of the interrogation signal divided by a duration of a single message transmission.

9. The method of claim 1 wherein a range of the interrogation signal is limited, thereby limiting the size of the interrogation zone and consequently, the number of intelligent devices located therein.

10. The method of claim 1 wherein the second predetermined radio frequency is the same as the first predetermined radio frequency.

11. A radio frequency intelligent device comprising:
an integrated circuit for storing data;
an antenna connected to the integrated circuit, wherein exposure of the antenna to an electromagnetic field at a first predetermined radio frequency induces a voltage therein which provides power to the integrated circuit such that the data stored therein is read from the integrated circuit and repeatedly transmitted at a second predetermined radio frequency; and
a timer circuit for creating a predetermined transmission period for repeatedly transmitting the integrated circuit data at the second predetermined radio frequency and a fixed wait period between each predetermined transmission period, wherein the wait period is much greater than the transmission period, wherein for a plurality of devices, a length of the fixed wait period varies from device to device due solely to manufacturing tolerances in electrical components of the devices, the manufacturing tolerances being sufficiently large so that the fixed wait period varies from device to device by a sufficiently significant length so as to significantly reduce the probability of collisions between devices.

12. The method of claim 11 wherein the manufacturing tolerance of the electrical components is about +/−20%.

13. The method of claim 11 wherein the manufacturing tolerance of the electrical components is about +/−5%.

14. The device of claim 11 wherein the integrated circuit device comprises a non-volatile programmable memory.

15. The method of claim 11 wherein the second predetermined radio frequency is the same as the first predetermined radio frequency.

16. A radio frequency identification device comprising:
an integrated circuit for storing data;
an antenna connected to the integrated circuit, the antenna comprising an inductor and a capacitor, wherein exposure of the antenna to an electromagnetic field at a first predetermined radio frequency induces a voltage in the inductor which provides power to the integrated circuit such that the data stored therein is read and provides a continuous data output signal;
a transmitter for repeatedly transmitting the data output signal at a second predetermined radio frequency; and
a timer for establishing a fixed non-transmission period between each data transmission period, wherein a length of the non-transmission period is much greater than a length of the transmission period, the timer comprising a plurality of electrical components, a manufacturing tolerance of the electrical components causing variations in the length of the fixed non-transmission period among devices, wherein the length of the fixed non-transmission period is different for each device among the plurality of devices due solely to the manufacturing tolerance of the electrical components of each device, and wherein the manufacturing tolerances are sufficiently large so as to significantly vary the fixed non-transmission period among the devices and thereby significantly reduce the probability that two or more of a plurality of devices will transmit their respective messages simultaneously.

17. The device of claim 16, wherein a ratio of the fixed non-transmission period to the transmission period is about 100:1.

18. A plurality of radio frequency intelligent devices, each device comprising:
an integrated circuit for storing data;
an antenna connected to the integrated circuit, wherein exposure of the antenna to an electromagnetic field at a first predetermined radio frequency induces a voltage therein which provides power to the integrated circuit such that the data stored therein is read from the integrated circuit and repeatedly transmitted at a second predetermined radio frequency; and
a timer circuit for creating a predetermined transmission period for repeatedly transmitting the integrated circuit data at the second predetermined radio frequency and a fixed wait period between each predetermined transmission period, wherein the wait period is much greater than the transmission period, wherein for a plurality of devices, a length of the fixed wait period varies from device to device due solely to manufacturing tolerances in electrical components of the devices, the manufacturing tolerances being sufficiently large so that the fixed wait period varies from device to device by a sufficiently significant length so as to significantly reduce the probability of collisions between devices.

19. The devices according to claim 18 wherein the manufacturing tolerance of the electrical components is about +/−20%.

20. The devices according to claim 18 wherein the manufacturing tolerance of the electrical components is about +/−5%.

21. A method of making a plurality of radio frequency intelligent devices, each device comprising (i) an integrated circuit for storing data, (ii) an antenna connected to the integrated circuit, wherein exposure of the antenna to an electromagnetic field at a first predetermined radio frequency induces a voltage therein which provides power to the integrated circuit such that the data stored therein is read from the integrated circuit and repeatedly transmitted at a second predetermined radio frequency, and (iii) a timer circuit for creating a predetermined transmission period for repeatedly transmitting the integrated circuit data at the second predetermined radio frequency and a fixed wait period between each predetermined transmission period, wherein the wait period is much greater than the transmission period, wherein for a plurality of devices, a length of the fixed wait period varies from device to device due solely to manufacturing tolerances in electrical components of the devices, the manufacturing tolerances being sufficiently large so that the fixed wait period varies from device to device by a sufficiently significant length so as to significantly reduce the probability of collisions between devices.

22. The devices according to claim 21 wherein the manufacturing tolerance of the electrical components is about +/−20%.

23. The devices according to claim 21 wherein the manufacturing tolerance of the electrical components is about +/−5%.

24. A plurality of radio frequency identification devices, each device comprising:

an integrated circuit for storing data;

an antenna connected to the integrated circuit, the antenna comprising an inductor and a capacitor, wherein exposure of the antenna to an electromagnetic field at a first predetermined radio frequency induces a voltage in the inductor which provides power to the integrated circuit such that the data stored therein is read and provides a continuous data output signal;

a transmitter for repeatedly transmitting the data output signal at a second predetermined radio frequency; and a timer for establishing a fixed non-transmission period between each data transmission period, wherein a length of the non-transmission period is much greater than a length of the transmission period, the timer comprising a plurality of electrical components, a manufacturing tolerance of the electrical components causing variations in the length of the fixed non-transmission period, wherein the length of the fixed non-transmission period is different for each device among the plurality of devices due solely to the manufacturing tolerance of the electrical components of each device, and wherein the manufacturing tolerances are sufficiently large so as to significantly vary the fixed non-transmission period among the devices and thereby significantly reduce the probability that two or more of a plurality of devices will transmit their respective messages simultaneously.

25. The devices according to claim 24 wherein a ratio of the fixed non-transmission period to the transmission period is about 100:1.

26. The devices according to claim 24 wherein the manufacturing tolerance of the electrical components is about +/−20%.

27. The devices according to claim 24 wherein the manufacturing tolerance of the electrical components is about +/−5%.

28. A method of making a plurality of radio frequency identification devices, each device comprising (i) an integrated circuit for storing data, (ii) an antenna connected to the integrated circuit, the antenna comprising an inductor and a capacitor, wherein exposure of the antenna to an electromagnetic field at a first predetermined radio frequency induces a voltage in the inductor which provides power to the integrated circuit such that the data stored therein is read and provides a continuous data output signal, (iii) a transmitter for repeatedly transmitting the data output signal at a second predetermined radio frequency, (iv) a timer for establishing a fixed non-transmission period between each data transmission period, wherein a length of the non-transmission period is much greater than a length of the transmission period, the timer comprising a plurality of electrical components, a manufacturing tolerance of the electrical components causing variations in the length of the fixed non-transmission period, wherein the length of the fixed non-transmission period is different for each device among the plurality of devices due solely to the manufacturing tolerance of the electrical components of each device, and wherein the manufacturing tolerances are sufficiently large so as to significantly vary the fixed non-transmission period among the devices and thereby significantly reduce the probability that two or more of a plurality of devices will transmit their respective messages simultaneously.

29. The method according to claim 28 wherein a ratio of the fixed non-transmission period to the transmission period for each of the devices is selected to be about 100:1.

30. The method according to claim 28 wherein the manufacturing tolerance of the electrical components for each of the devices is selected to be about +/−20%.

31. The devices according to claim 28 wherein the manufacturing tolerance of the electrical components for each of the devices is selected to be about +/−5%.

* * * * *

UNITED STATES PATENT AND TRADEMARK OFFICE
CERTIFICATE OF CORRECTION

PATENT NO. : 5,883,582  Page 1 of 1
DATED : March 16, 1999
INVENTOR(S) : John H. Bowers et al.

It is certified that error appears in the above-identified patent and that said Letters Patent is hereby corrected as shown below:

Column 11,
Lines 59, 61 and 65, replace the word "method" with the word -- device --.

Column 13,
Lines 16 and 19, replace the word "devices" with the word -- method --.

Column 14,
Line 45, replace the word "devices" with the word -- method --.

Signed and Sealed this

Seventeenth Day of May, 2005

JON W. DUDAS
*Director of the United States Patent and Trademark Office*